Feb. 28, 1956  A. VAUGOYEAU  2,736,551
ADJUSTABLE SUSPENSIONS FOR AUTOMOBILE VEHICLES
Filed Oct. 5, 1953

INVENTOR:-
ALEXANDRE VAUGOYEAU

By:- Chatwin & Company
ATTYS.

United States Patent Office 2,736,551
Patented Feb. 28, 1956

2,736,551

ADJUSTABLE SUSPENSIONS FOR AUTOMOBILE VEHICLES

Alexandre Vaugoyeau, Marseille, France

Application October 5, 1953, Serial No. 385,387

Claims priority, application France October 9, 1952

2 Claims. (Cl. 267—54)

This invention relates to wheel suspension means for vehicles, and more particularly to that form of suspension which includes, for an axle carrying two wheels, a pair of multiple leaf springs arranged parallel to the longitudinal axis of the chassis and secured at their ends to spaced bearers on the chassis.

The object of the invention is to provide means whereby the position of each spring, in the longitudinal direction of the chassis, may be altered and secured in a simple and convenient manner for adjustment of the transverse positioning of the axle with respect to the chassis.

Figure 1:
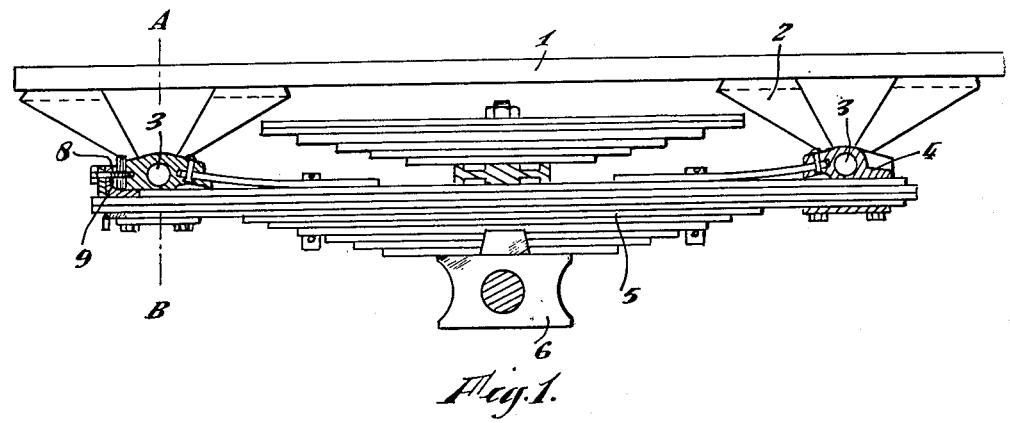
Figure 2:
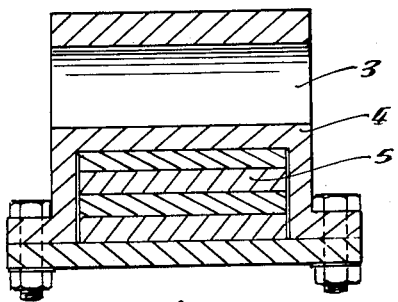
Figure 3:
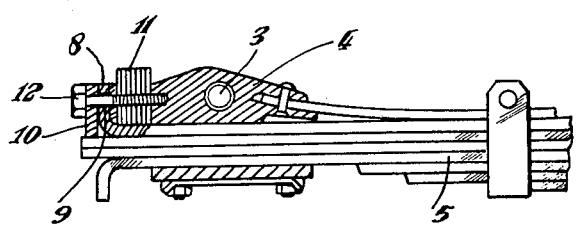

An example of construction of suspension in accordance with the invention is hereinafter described with reference to the accompanying drawing, wherein:

Fig. 1 is a side elevation of part of a chassis with a spring and axle assembled thereon; Fig. 2 is a partial transverse section taken on the line "A—B" of Fig. 1; Fig. 3 is a partial side elevation, to an enlarged scale, of the left hand end of the spring of Fig. 1.

In these figures, a chassis 1 has bearers 2 carrying horizontal pivots 3 for front and rear shackle blocks 4 arranged at the ends of a multiple leaf spring 5 to which an axle 6 is centrally secured. The right hand shackle block 4, in Fig. 1, is pivotally mounted by the pivot 3 for rotation about a horizontal axis parallel to the wheel axis and has a passage receiving as a sliding fit one end of a plurality of leaves of the spring 5. The other shackle block 4, at the left hand end of the spring in Fig. 1, is also similarly mounted and likewise has a passage receiving as a sliding fit the left hand end of the plurality of leaves of the spring 5. Said block 4 also includes a screw-threaded bore 7 in parallel alignment with the longitudinal axis of the spring leaves. On that end of the uppermost spring leaf passed through said shackle block there is an upturned portion 8 having in it a clearance hole 9 in alignment with the bore 7. An apertured plate 10 is disposed at the outside of the upturned portion 8 of the spring leaf, and shims 11 are disposed between said upturned portion of the spring and the shackle block 4. A threaded bolt 12 is engaged through the apertured plate 10, the upturned portion 8, and the shims 11 and is threaded into the bore 7 of the shackle block 4.

The operation is as follows:

For adjustment of the position of the spring and axle longitudinally of the chassis during assembly, so as to ensure that the axle assumes an exactly transverse position with respect to the chassis, the number of shims 11 is altered until the required position is obtained. If the positioning of the axle should alter after a period of use, the number of shims can again be altered to bring the axle back into correct position again.

When the vehicle is in use and varying loads are imposed on the springing, the leaf spring 5 bends to a greater or lesser extent into an arc and the variation in length between the two shackle blocks 4, secured at a fixed spacing on the chassis 1, is permitted by sliding of the right-hand end of the spring leaves in the shackle block 4 at the right hand end thereof.

I claim:

1. In a vehicle having a chassis and an axle carrying a wheel, a suspension for said wheel comprising a multiple-leaf spring secured centrally to the axle, a first shackle block pivotally mounted on the chassis for rotation about a horizontal axis parallel to the wheel axis and having a passage receiving as a sliding fit one end of a plurality of leaves of the spring, a second shackle block pivotally mounted on the chassis for rotation about a horizontal axis parallel to the wheel axis and having a passage receiving as a sliding fit the other end of the said plurality of leaves of the spring, said second shackle block having a screw-threaded bore in parallel alignment with the longitudinal axis of the spring leaves and means including a threaded bolt engaged with the end of one of said plurality of spring leaves and threaded into said bore for securing said leaf to the second shackle block whilst permitting adjustment of said leaf longitudinally with respect to the second shackle block.

2. In a vehicle having a chassis and an axle carrying a wheel, a suspension for said wheel comprising a multiple-leaf spring secured centrally to the axle, a first shackle block pivotally mounted on the chassis for rotation about a horizontal axis parallel to the wheel axis and having a passage receiving as a sliding fit one end of a plurality of leaves of the spring, a second shackle block pivotally mounted on the chassis for rotation about a horizontal axis parallel to the wheel axis and having a passage receiving as a sliding fit the other end of the said plurality of leaves of the spring, said second shackle block having a screw-threaded bore in parallel alignment with the longitudinal axis of the spring leaves, an upturned portion on that end of the uppermost spring leaf which is passed through the second shackle block, said end portion having a clearance hole there-through in alignment with the bore of the second shackle block, an apertured plate disposed at the outside of said upturned portion of the spring, shim means engaged between said upturned portion of the spring and the second shackle block, and a threaded bolt engaged through the apertured plate, the upturned portion of the spring, and the shim means and threaded into the bore of the second shackle block.

References Cited in the file of this patent

UNITED STATES PATENTS

| 1,577,767 | Smith | Mar. 23, 1926 |
| 1,829,163 | Sprong | Oct. 27, 1931 |
| 2,058,281 | Wesley | Oct. 20, 1936 |
| 2,290,034 | Carter | July 14, 1942 |

FOREIGN PATENTS

| 142,605 | Great Britain | May 13, 1920 |
| 370,612 | Great Britain | Apr. 14, 1932 |
| 627,953 | France | June 20, 1927 |